United States Patent [19]

Morita et al.

[11] 4,323,877

[45] Apr. 6, 1982

[54] TURN DIRECTION DETECTOR FOR USE IN AUTOMOBILE

[75] Inventors: Masayuki Morita, Tokoname; Tasuku Nakano, Mizunami; Kazuhisa Kubota, Ichinomiya, all of Japan

[73] Assignee: Kabushiki Kaisha Tokai Rika Denki Seisakusho, Aichi, Japan

[21] Appl. No.: 235,736

[22] Filed: Feb. 18, 1981

[30] Foreign Application Priority Data

Feb. 22, 1980 [JP] Japan .................................. 55-21102
Apr. 4, 1980 [JP] Japan .................................. 55-44759

[51] Int. Cl.³ .............................................. B60Q 1/42
[52] U.S. Cl. ......................................... 340/56; 340/73; 200/61.35
[58] Field of Search ................... 340/54, 55, 56, 73, 340/74; 200/61.27, 61.28, 61.3, 61.31, 61.35, 61.38, 61.39

[56] References Cited

U.S. PATENT DOCUMENTS

2,673,905 3/1954 Butler .................................... 340/55
3,364,319 1/1968 Elliott .................................... 340/56

*Primary Examiner*—Alvin H. Waring
*Attorney, Agent, or Firm*—Wenderoth, Lind & Ponack

[57] ABSTRACT

A turn direction detector for use in an automobile includes two sets of switch arrangements provided in association with a steering wheel shaft. One switch arrangement closes when a steering wheel is rotated clockwise and the other switch arrangement closes when the steering wheel is rotated counterclockwise. Signals obtained from these switch arrangements are used for effecting the cancellation of right and left turn indicators.

11 Claims, 15 Drawing Figures

TURN DIRECTION DETECTOR FOR USE IN AUTOMOBILE

BACKGROUND OF THE INVENTION

The present invention relates to a turn indicator system for use in automobile, and more particularly, to a detector for detecting the direction of turn of a steering wheel shaft.

Generally, the automobile has a turn indicator system including a turn indicator lever provided at a position within reach of a driver and adjacent to, for example, a steering wheel, for tilting or pivotal movement in clockwise and counterclockwise directions from a neutral position, a switch unit provided in association with the turn indicator lever, and right and left indicator lamps, the right indicator lamp or lamps being actuated to blink when the turn indicator lever is tilted clockwise, and the left indicator lamp or lamps being actuated to blink when the turn indicator lever is tilted counterclockwise.

The turn indicator system of the above described typical arrangement further includes an automatic cancellation mechanism provided in association with the steering wheel to automatically return the tilted indicator lever to the neutral position after the completion of a turning movement of the automobile.

According to the prior art turn indicator system, the automatic cancellation mechanism is totally formed by a mechanical arrangement which is bulky in size, provided essentially in the vicinity of and in association with the turn indicator lever and thus occupies a large space under the steering wheel, resulting in the reduced freedom of choice of design for the accommodation of the turn indicator system.

Recently, in compliance with the development of automobile electronics, many changes and variations have been made to the layout of the instruments in the dashboard in a sophisticated manner, and for this purpose, some devices and systems require reorganization in such a manner as to improve the adaptability of the installation. As to the turn indicator system, it is required to provide a detecting means for detecting the direction of turn of the steering wheel and producing an electrical signal in response to the detection.

SUMMARY OF THE INVENTION

Accordingly, it is a primary object of the present invention to provide a turn direction detector for detecting the direction of turn of the steering wheel shaft.

It is also a primary object of the present invention to provide a turn direction detector of the above described type which is simple in construction and can readily be manufactured at low cost.

In accomplishing these and other objects, a turn direction detector according to the present invention comprises a support member fixedly connected to a housing of the steering wheel shaft. First and second terminal means are provided on the support member at a predetermined angle spaced from each other about an axis of the steering wheel shaft. A ring member is loosely mounted on the steering wheel shaft for rotation about the steering wheel shaft between a first rotated position and a second rotated position. The ring member is provided with a first electrical contact means which can be moved to a position correlative with the first terminal means when the ring member is rotated to the first rotated position, and correlative with the second terminal means when the ring member is rotated to the second rotated position. A drive member is connected to the steering wheel shaft for effecting the simultaneous rotation with the steering wheel shaft, and has a portion which is held in contact with the ring member for producing a frictional force between the portion and the ring member. By the frictional force, the ring member is moved to the first rotated position when the steering wheel shaft is rotated in a first direction and to the second rotated position when the steering wheel shaft is rotated in a second direction. Provided on the drive member is a second electrical contact means which slidably moves past the first electrical contact means during the rotation of the drive member. By the above arrangement, a closed electrical circuit is established among the first and second electrical contact means and the first terminal means during the rotation of the steering wheel shaft in the first direction and among the first and second electrical contact means and the second terminal means during the rotation of the steering wheel shaft in the second direction.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE PREFERRED EMBODIMENTS

Figure 1:
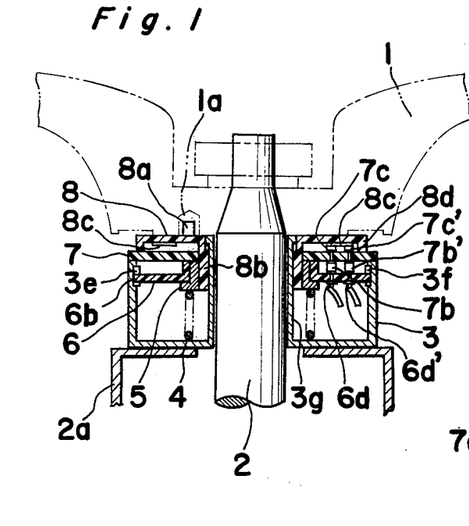
FIG. 1 is a cross sectional view of a turn direction detector according to the first embodiment of the present invention.
Figure 2:
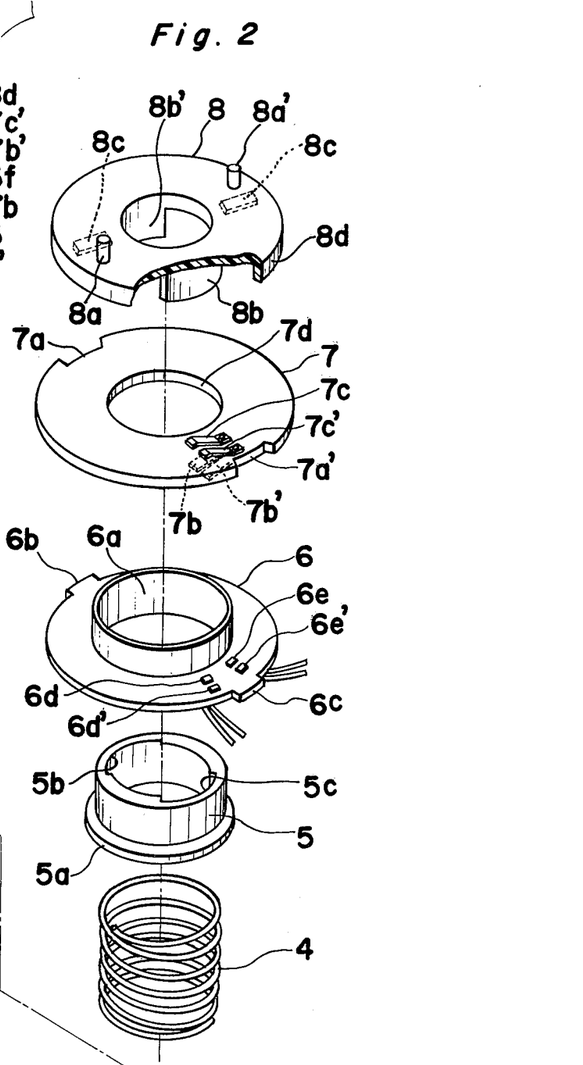
FIG. 2 is an exploded view of the turn direction detector of FIG. 1.

Referring to FIGS. 1 and 2, a turn direction detector of the first embodiment of the present invention is provided around and in association with a steering wheel shaft 2 at a position adjacent to a steering wheel 1, and comprises, as best shown in FIG. 2, a support 3 formed by an annular plate 3a having a central opening, a wall 3b mounted on the perimeter of the annular plate 3a, a pair of projections 3c and 3d mounted on the upper edge of the wall 3b in an opposed relationship with each other, a pair of recesses 3e and 3f formed on the inner surface of the wall 3b at positions below the projections 3c and 3d, respectively, and a cylinder 3g mounted on the annular plate 3a in a coaxial relationship with the central opening in the plate 3a to slidingly receive therein the steering wheel shaft 2. The height of the cylinder 3g is greater than that of the wall 3b. It is to be noted that the support 3 is fixedly connected to a housing, or a steering shaft column 2a of the steering wheel shaft 2, as shown in FIG. 1.

A rotator 5 having a flange 5a at its bottom and a pair of engagement recesses 5b and 5c on its inner surface is rotatably mounted on the cylinder 3g of the support 3. A coil spring 4 is mounted on the cylinder 3g between the annular plate 3a and the flange 5a for biasing the rotator 5 in a direction away from the annular plate 3a.

An annular base plate 6 made of electrically non-conductive material has a central opening and a cylindrical wall 6a surrounding the central opening for slidingly receiving the rotator 5. The annular base plate 6 further has a pair of projections 6b and 6c extending radially and outwardly from the plate 6 in opposite directions from each other. These projections 6b and 6c are inserted into the recesses 3e and 3f, respectively, of the wall 3b. Since the projections 6b and 6c fittingly engage with the recesses 3e and 3f in a widthwise direction and loosely engage in a thickness direction, the annular base plate 6 may move, with respect to the support 3, up and down along its axial direction but may not rotate about its axis. The base plate 6 is normally held up by the urging force of the spring 4. A pair of terminals 6d and 6d' aligned in a radial direction is fixedly provided on the base plate 6 adjacent to the projection 6c. Another pair of terminals 6e and 6e' is provided on the base plate 6 in side-by-side relation to the previous pair.

A disc 7 made of electrically non-conductive material and having a diameter approximately equal to the diameter of a circuit enclosed by the wall 3b is formed in a pair of recesses 7a and 7a' in its perimeter and a central opening 7d. The disc 7 is mounted on the cylinder 3g such that the perimeter of the disc 7 is supported on the upper edge of the wall 3b and the disc portion along the central opening 7d is supported on the upper edge of the rotator 5. The projections 3c and 3d are loosely engged in the recesses 7a and 7a' so that the disc 7 may rotate within a degree defined by the width of the recesses 7a and 7a' and the width of the projections 3c and 3d. The disc 7 further has a pair of feelers 7b and 7b' each made of electrically conductive material and extending downwardly from the surface of the disc 7 and another pair of feelers 7c and 7c' made of electrically conductive material and extending upwardly from the surface of the disc 7. It is to be noted that the feeler 7b is electrically connected to the feeler 7c, and the feeler 7b' is electrically connected to the feeler 7c' through a suitable connecting means, such as a bolt.

A driving plate 8 made of electrically non-conductive material has a pair of pins 8a and 8a' which are provided for the engagement with recesses 1a, respectively, of the steering wheel 1. The driving plate 8 is formed with a pair of curved walls 8b and 8b' extending in a direction opposite to the pins 8a and 8a'. The curved walls 8b and 8b' are fittingly inserted into engagement recesses 5b and 5c formed in the rotator 5. Accordingly, the rotational movement of the steering wheel 1 is transmitted through the driving plate 8 to the rotator 5. The driving plate 8 further has at least one, (two are shown in FIG. 2 as an example), contact element 8c made of an electrically conductive material bonded on a surface that faces the disc 7. The perimeter of the driving plate 8 is formed with a wall 8d of which the lower edge is held in contact with the disc 7. Accordingly, since the rotator 5 is biased upwardly by the coil spring 4, the disc 7 is tightly held between the rotator 5 and the driving plate 8, more specifically between the upper edge of the rotator 5 and the lower edge of the wall 8d. The operator of the turn direction detector of the above described embodiment is explained below.

When the driving plate 8 is rotated, for example, clockwise by the rotation of the steering wheel 1, the rotator 5 is rotated theretogether. Since the disc 7 is held between the rotator 5 and the driving plate 8, it also receives the rotational force from the steering wheel 1. However, since the projections 3c and 3d are located in the recesses 7a and 7a', respectively, the disc 7 is allow to rotate a predetermined degree determined by the width of the recesses 7a and 7a' formed in the disc 7. When the disc 7 is rotated clockwise until the projections 3c and 3d come into contact with one edge of the recesses 7a and 7a' (FIG. 3(b)), the feelers 7b and 7b' come into contact with the terminals 6d and 6d'. A further clockwise rotation of the steering wheel 1 brings the contact element 8c in a bridged condition with respect to the feelers 7c and 7c' (FIG. 3c), resulting in an electrical contact between the feelers 7c and 7c'. Accordingly, the terminals 6d and 6d' are connected to each other. Therefore, it can be considered that the terminals 6d and 6d' together with the associated parts (feelers 7b, 7b', 7c and 7c' and contact elements 8c and 8c') constitute a switch arrangement SR that closes when the steering wheel 1 is rotated clockwise, thus detecting the clockwise rotation of the steering wheel 1.

Figure 3A:
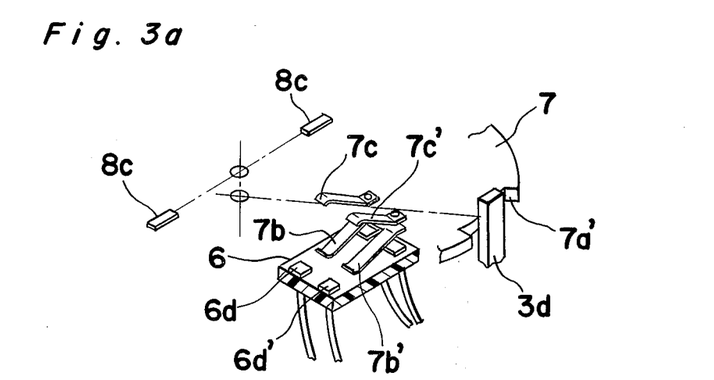
FIGS. 3a, 3b and 3c are schematic views showing various positions of the turn direction detector of FIG. 1.
Figure 3B:
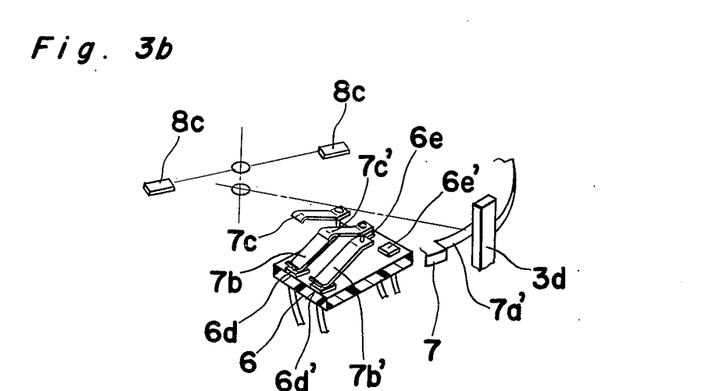
Figure 3C:
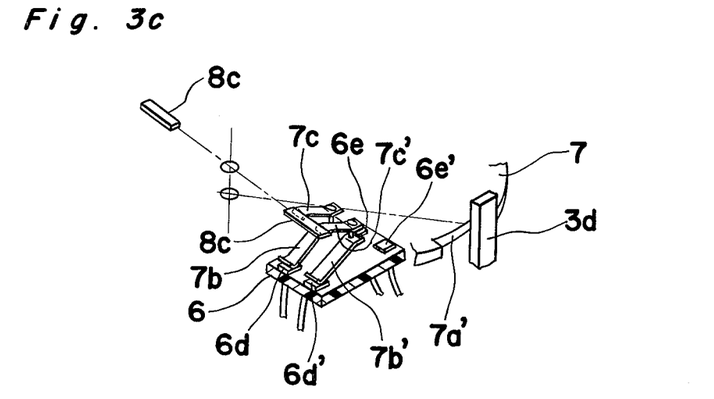

On the other hand, when the driving plate 8 is rotated counterclockwise by the counterclockwise rotation of the steering wheel 1, the disc 7 is also rotated counterclockwise until the projections 3c and 3d come into contact with the other edge of the recesses 7a and 7a'. In this case, the feelers 7b and 7b' come into contact with the terminals 6e and 6e'. A further rotation of the steering wheel 1 brings the contact element 8c in a bridged condition with respect to the feelers 7c and 7c', resulting in an electrical connection between the terminals 6e and 6e'. Therefore, in this case, the terminals 6e and 6e' and the associated parts can be considered as a switching arrangement SL that closes when the steering wheel 1 is rotated counterclockwise, thus, detecting the counterclockwise rotation of the steering wheel 1.

When making a right turn of the automobile, the driver first turns the steering wheel 1 clockwise, and then, counterclockwise. Accordingly, in this case, the switch arrangement SR (terminals 6d and 6d') is first closed, and then, switch arrangement SL (terminals 6e and 6e') is closed. These switch arrangements SR and SL are coupled with a control circuit described later in connection with FIGS. 9 and 10.

According to the present invention, since the driving plate 8 can smoothly rotate over the disc 7, no annoying noise, such as clicking noise, is produced during the rotation of the steering wheel 1, even when the turn indicator level is tilted rightwardly or leftwardly from its neutral position.

Furthermore, since the switch arrangement SR or SL is closed every after a predetermined degree of rotation of the steering wheel 1 determined by the number of contact elements 8c, the signal obtained from the switch arrangements SR and SL can be used for detecting the degree of rotation of the steering wheel 1. In this case, it is preferable to employ a counter which counts the number of signals from the switch arrangements SR and SL.

Figure 4:
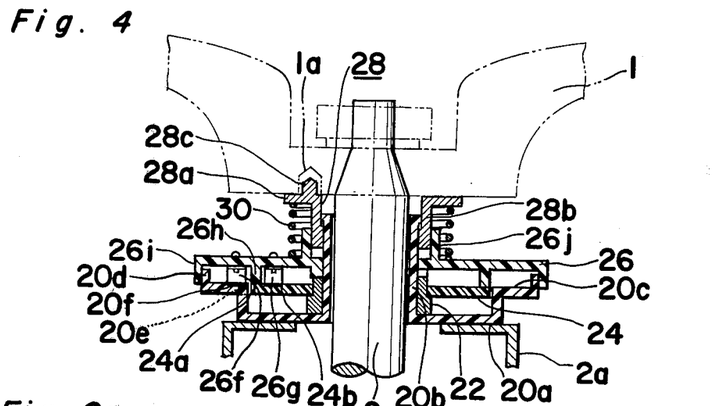
FIG. 4 is a cross sectional view of a turn direction detector according to the second embodiment of the present invention.
Figure 5:
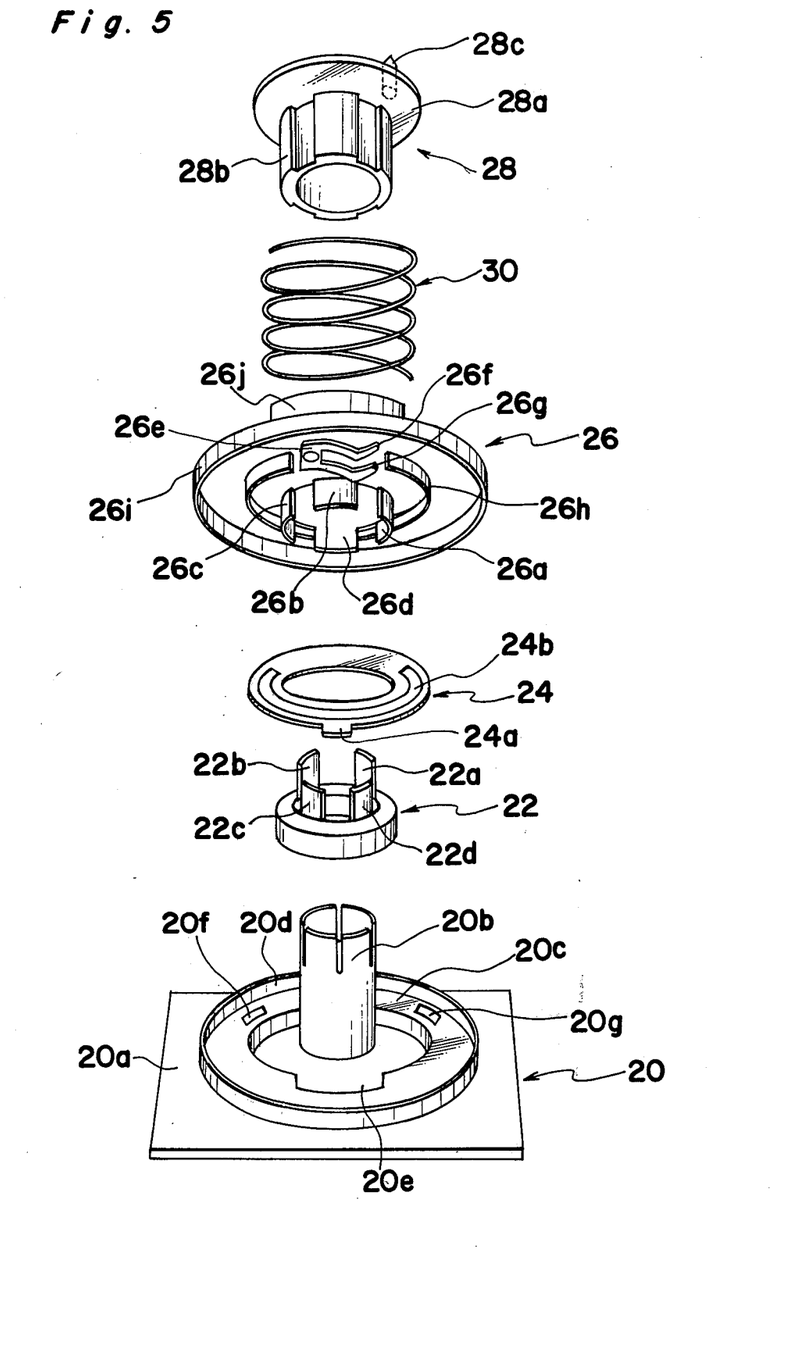
FIG. 5 is an exploded view of the turn direction detector of FIG. 4.

Referring to FIGS. 4 and 5, a turn direction detector of the second embodiment comprises a support 20 made of an electrically non-conductive material and fixedly connected to the housing 2a of the steering wheel shaft 2 and formed by a rectangular plate 20a having a central opening and a cylinder 20b mounted on the plate 20a in a coaxial relationship to the central opening to slidingly receive therein the steering wheel shaft 2. The support 20 is further formed with a step-up portion 20c coaxially provided around the cylinder 20b for defining a concave surface. The step-up portion 20c is surrounded by a wall 20d. An inner face of the step-up portion 20c is formed with a recess 20e having a predetermined width. A pair of contact elements 20f and 20g made of an electrically conductive material are mounted in the step-up portion 20c, and spaced 120° from each other about the axis of the cylinder 20b.

Figure 6A:
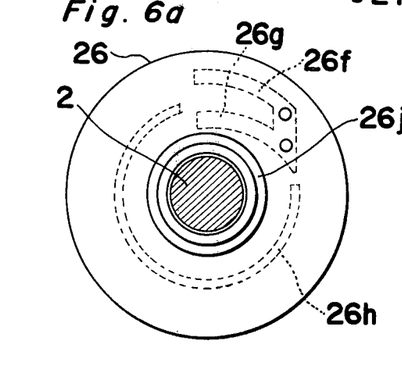
FIGS. 6a, 6b, 6c and 6d are top plane views of the turn direction detector of FIG. 5 in different positions.
Figure 6B:
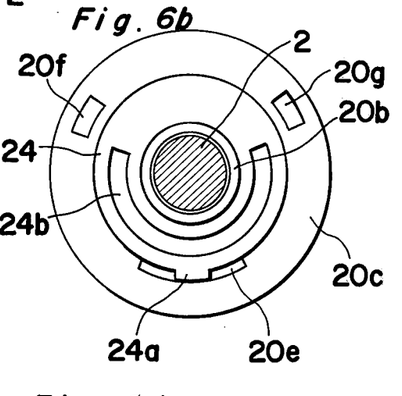
Figure 6C:
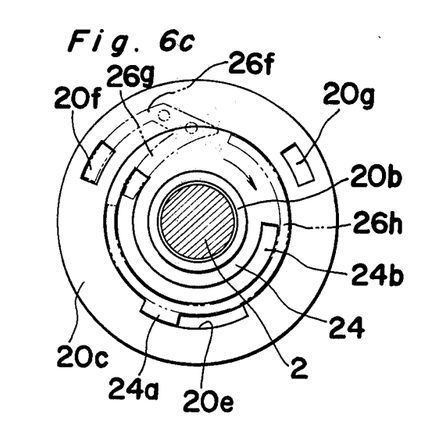
Figure 6D:
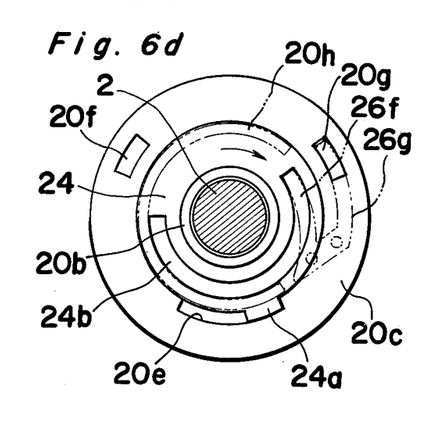

A ring member 22 having four projections 22a, 22b, 22c and 22d extending upwardly and defining a portion of cylinder is rotatably mounted on the cylinder 20b inside the concave surface formed by the stop-up portion 20c. A ring plate 24 made of electrically non-conductive material is rotatably mounted on the cylinder defined by the projections 22a, 22b, 22c and 22d and supported on the upper face of the ring member 22. Accordingly the ring plate 24 is also located inside the concave surface. A tongue 24a radially extending from the ring plate 24 is located within the recess 20e to allow the rotation of ring plate 24 only between a first rotated position in which the tongue 24a comes into contact with left-hand edge of the recess 20e when viewed in FIG. 5, and a second rotated position in which the tongue 24a comes into contact with right-hand edge of the recess 20e. The ring plate 24 is provided with an electrode 24b in a shape of a horse-shoe that extends approximately 240° about the center of the ring plate 24. The electrode 24b is arranged such that its one end comes in alignment with the contact element 20f when the ring plate 24 is rotated to its first rotated position, as shown in FIG. 6c, and the other end of the electrode 24 comes in alignment with the contact element 20g when the ring plate 24 is rotated to its second rotated position, as shown in FIG. 6d.

A rotator 26 made of an electrically non-conductive material has a central opening and four projections 26a, 26b, 26c and 26d extending downwardly defining a portion of cylinder and is rotatably mounted on the cylinder 20b in such a manner as to engage the projections 26a, 26b, 26c and 26d with the four projections 22a, 22b, 22c and 22d of the ring member 22 to form a complete cylinder therewith. The rotator 26 further has a bifurcated feeler 26e made of an electrically conductive material and including arms 26f and 26g, the arm 26f being adapted for the contact with contact element 20f or 20g during the rotation of the rotator 26 and the arm 26g being adapted for the contact with the electrode 24b during the rotation of the rotator 26. To prevent the ring plate 24 from being undesirably removed out from the concave surface and to ensure the termination of the ring plate 24 to its first and second rotated position effected by the clockwise and counterclockwise rotations of the rotator 26, the rotator 26 is provided with a curved wall 26h which starts from one end of the bifurcated feeler 26e extending around the opening and terminates at the other end of the bifurcated feeler 26e so as to allow the lower end of the curved wall 26h contact the upper surface of the ring plate 24 outside the horse-shoe shaped electrode 24b, as shown in FIG. 4. The periphery of the rotator 26 is formed with an annular wall 26i which fittingly covers the wall 20d of the support 20. The upper surface of the rotator 26 is formed with a cylinder 26j in a coaxial relationship with the central opening.

A driving rotator 28 formed by a top plate 28a and a cylinder body 28b is connected to the rotator 26 in such manner that the cylindrical body 28b formed with recesses in a shape of a column is fixedly inserted into the cylinder 26j of the rotator 26. The top plate 28a is provide with one or more pins 28c which is inserted into the recess 1a formed in the steering wheel 1 for transmitting the rotational force of the steering wheel 1 to the driving rotator 28 and further to the rotator 26 and ring member 22. A coil spring 30 is mounted on the cylinder 26j of the rotator 26 for urging the rotator 26 towards the support 20.

Although the arms 26f and 26g of the feeler 26e described in this embodiment extend in the same direction, they can be extended in an opposite direction with each other. In this case, it is necessary to adjust the location of the horse-shoe shaped electrode 24b.

The turn direction detector of the second embodiment operates in the following manner.

When the steering wheel 1 is rotated clockwise, the driving rotator 28, the rotator 28 and the ring member 22 are rotated clockwise together with the steering wheel 1. Furthermore, the ring plate 24 is shifted to its first rotated position, as shown in FIG. 6c, and is maintained in such a position by a frictional force produced between the ring plate 24 and the ring member 22 and also between the ring plate 24 and the rotator 26. By the clockwise rotation of the steering wheel 1, the bifurcated feeler 26e bridges between the contact element 20f and the horse-shoe electrode 24b to construct an electrically closed circuit therebetween, as shown in FIG. 6c. Therefore, it can be considered that the contact element 20f together with electrode 24b and bifurcated feeler 26e constitutes a switch arrangement SR.

On the other hand, when the steering wheel 1 is rotated counterclockwise, the driving rotator 28, rotator 26 and ring member 22 are rotated counterclockwise, and the ring plate 24 is shifted to its second rotated position. During the counterclockwise rotation, the bifurcated feeler 26e bridges between the contact element 20g and the horseshoe electrode 24b, as shown in FIG. 6d, to construct an electrically closed circuit therebetween. Therefore, it can be considered that the contact element 20g together with electrode 24b and bifurcated feeler 26e constitutes a switch arrangement SL.

Figure 9:
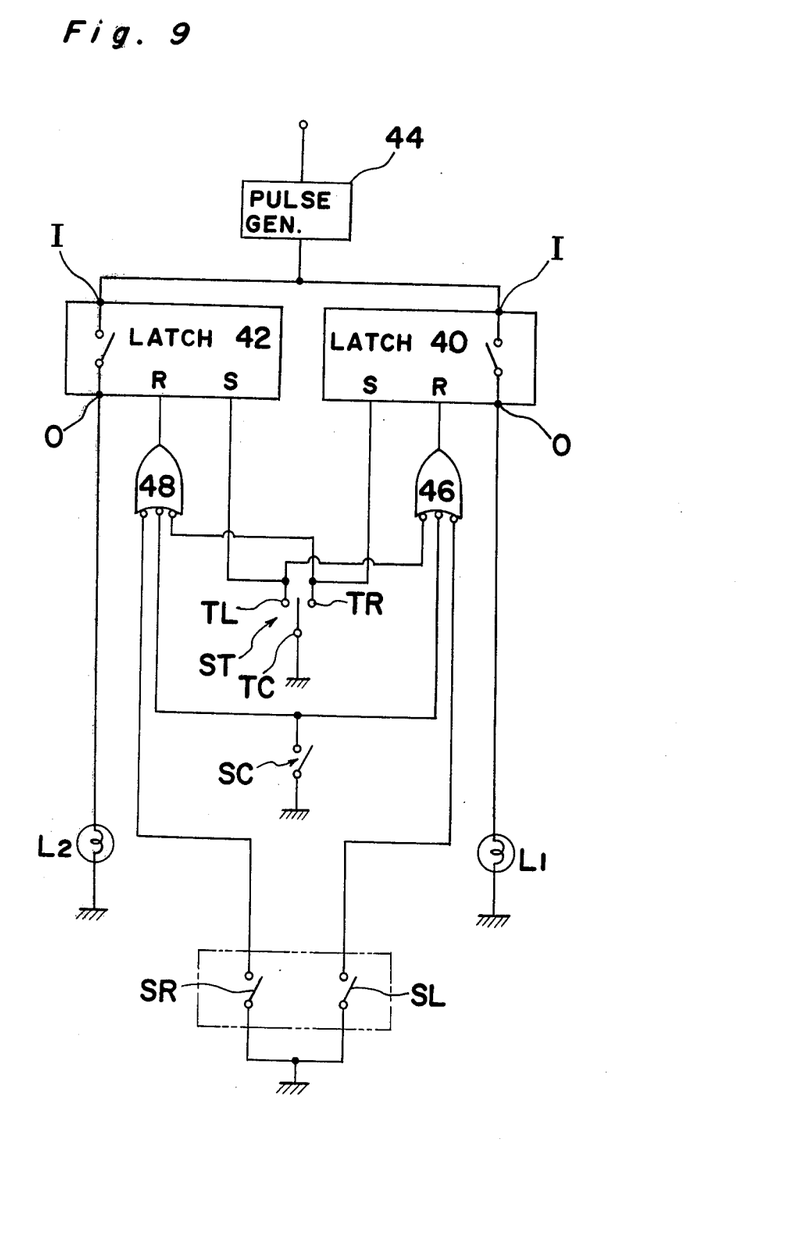
FIG. 9 is a circuit diagram showing a control circuit coupled with the turn direction detector of any one of the embodiments.
Figure 10:
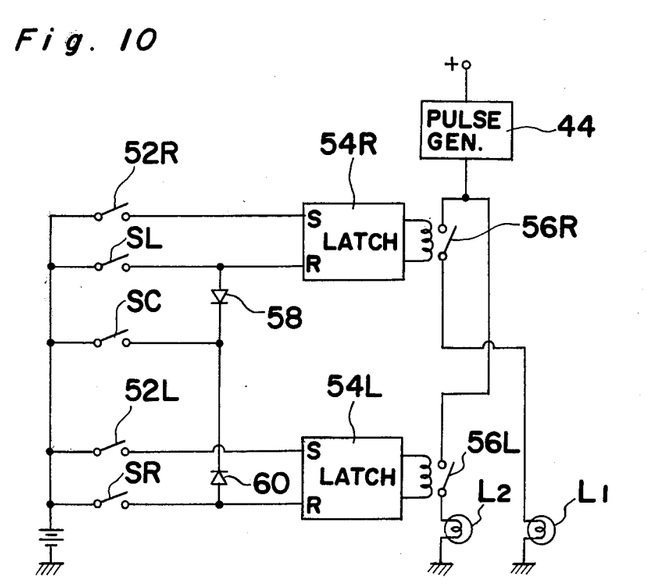
FIG. 10 is a circuit diagram showing another embodiment of the control circuit.

These switch arrangements SR and SL are coupled with a control circuit of FIG. 9 or FIG. 10.

Figure 7:
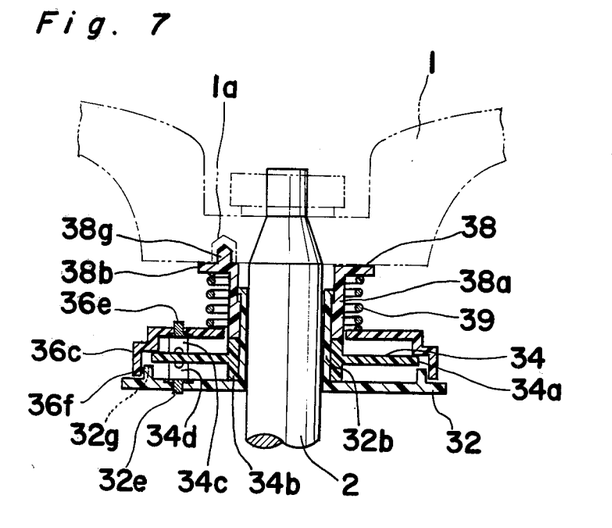
FIG. 7 is a cross sectional view of a turn direction detector according to the third embodiment of the present invention.
Figure 8:
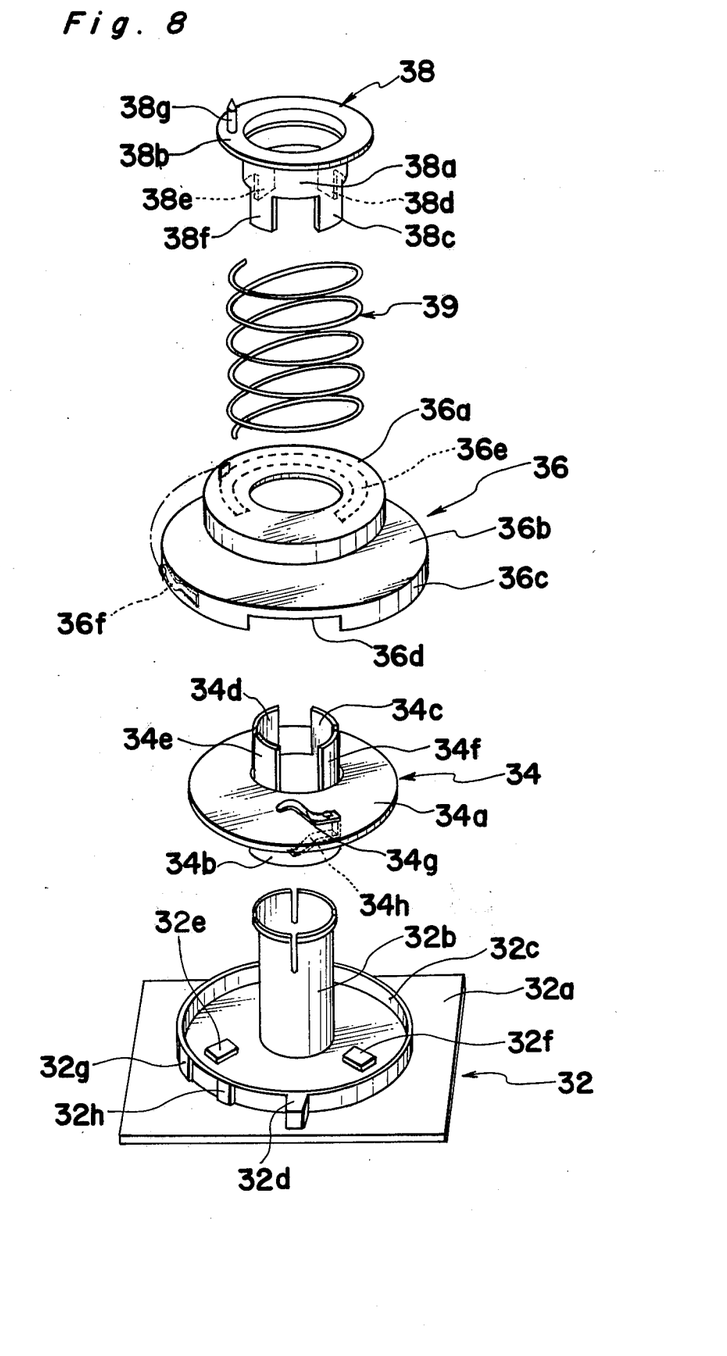
FIG. 8 is an exploded view of the turn direction detector of FIG. 7.

Referring to FIGS. 7 and 8, a turn direction detector of the third embodiment of the present invention comprises a support 32 made of an electrically non-conductive material and fixedly connected to the housing 2a of the steering wheel shaft 2. The support 32 is formed by a rectangular plate 32a having a central opening and a cylinder 32b mounted on the plate 32a in coaxial relation to the central opening to slidingly receive therein the steering wheel shaft 2. The support 32 is further formed with an annular wall 32c mounted on the plate 32a coaxially to the cylinder 32b. A projection 32d extends radially outwardly from the annular wall 32c.

The support 32 further has a pair of contact elements 32e and 32f which are mounted in the plate 32a inside the annular wall 32c and are spaced 120° from each other about the axis of the cylinder 32b, and a pair of electrodes 32g and 32h provided on a portion of outer surface of the annular wall 32c in a side-by-side relation with each other.

A rotator 34 made of an electrically non-conductive material is formed by a disc 34a having a central opening, a cylinder 34b mounted on, and extending downwardly from, the disc 34a in coaxial relation to the central opening to slidingly receive therein the cylinder 32b of the support 32 to contact the bottom end of the cylinder 34b with the plate 32a, and four projections 34c, 34d, 34e and 34f extending upwardly from the disc 34a and defining a portion of a cylinder which is coaxial with the central opening of the disc 34a. The rotator 34 is further formed with a pair of feelers 34g and 34h extending in opposite directions from the disc 34a. It is to be noted that the feelers 34g and 34h are electrically connected to each other through a suitable connecting means, such as a bolt. The feeler 34h comes into contact with the electrode 32e or 32f during the rotation of the rotator 34.

A cap member 36 made of an electrically non-conductive material is formed by a ring plate 36a having a central opening to slidingly receive therein the cylinder defined by the projections 34c, 34d, 34e and 34f and a collar 36b having a size greater than the ring plate 36a and located parallel to and offset from the ring plate 36a. An annular wall 36c extends downwardly from the outer edge of the collar 36b for covering the annular wall 32c of the support 32. A recess 36d is formed in the annular wall 36c for receiving therein the projection 32d of the support 32 so that the rotation of the cap member 36 is restricted between a first rotated position obtained when the projection 32d comes into contact with right-hand edge of the recess 36d when viewed in FIG. 8, and a second rotated position obtained when the projection 32d comes into contact with left-hand edge of the recess 36d. The cap member 36 further has a horse-shoe shaped electrode 36e provided on the surface of the ring plate 36a facing the rotator 34, and a feeler 36f provided on the inner surface of the annular wall 36c. It is to be noted that the horse-shoe shaped electrode 36e and the feeler 36f are electrically connected to each other through a suitable lead wire or any other connecting means such as an electrode deposited on the cap member 36. When the cap member 36 is mounted on the rotator 34, the collar 36b is supported on the peripheral portion of the disc 34a, as shown in FIG. 7, and the feeler 34g of the rotator 34 slidingly moves past the horse-shoe shaped electrode 36e during the rotation of the rotator 34. Furthermore, when the cap member 36 is rotated to the first rotated position, the feeler 36f comes into contact with the electrode 32g, and when the cap member 36 is rotated to the second rotated position, the feeler 36f comes into contact with the electrode 32h.

A driving rotator 38 is formed by a cylindrical body 38a, a flange 38b provided on one end of the cylindrical body 38a and four projections 38c, 38d, 38e and 38f provided on the other end of the cylindrical body 38a defining a portion of a cylinder. The driving rotator 38 further has one or more pin 38g which is provided for the engagement with the recess formed in the steering wheel 1. The cylindrical body 38a of the driving rotator 38 is inserted into the central opening of the ring plate 36a of the cap member 36 with a coil spring 39 held between the flange 38b and the ring plate 36a so that the cap member 36 is biased towards the rotator 34. The four projections 38c, 38d, 38e and 38f defining a cylinder are engaged with the four projections 34c, 34d, 34e and 34f of the rotator 34 to establish a complete cylinder therewith and to connect the driving rotator 38 with the rotator 34. The turn direction detector of the third embodiment operates as follows.

When the steering wheel 1 is rotated clockwise, the driving rotator 38 rotates clockwise together with the rotator 34. Accordingly, the cap member 36, which is connected to the rotator 34 through the frictional force between the disc 34a and the collar 36b, is rotated clockwise to terminate the cap member 36 to its first rotated position, resulting in a contact between the feeler 36f and the electrode 32g. A further clockwise rotation of the steering wheel 1 results in a contact between the horse-shoe shaped electrode 36e and the contact element 32f through the feelers 34g and 34h. Therefore, during the clockwise rotation of the steering wheel 1, a closed circuit is established between the electrode 32g and the contact element 32f. Thus, it can be considered that the electrode 32g and the contact element 32f and the associated parts constitute a switch arrangement SR that detects the clockwise turn of the steering wheel 1.

On the other hand, when the steering wheel 1 is rotated counterclockwise, the driving rotator 38 rotates counterclockwise together with the rotator 34, causing the termination of the cap member 36 to the second rotated position. In this case, the feeler 36f is connected to the electrode 32h. A further counterclockwise rotation of the steering wheel 1 results in contact between the horse-shoe shaped electrode 36e and the contact element 32e through the feelers 34g and 34h. Therefore, during the counterclockwise rotation of the steering wheel 1, a closed circuit is established between the electrode 32h and the contact element 32e. Thus, it can be considered that the electrode 32h and the contact element 32e and the associated parts constitute a switch arrangement SL that detects the counterclockwise turn of the steering wheel 1. These switch arrangements SR and SL are coupled with a control circuit described below.

Referring to FIG. 9, there is shown a control circuit which is operatively provided in association with the switch arrangements SR and SL of the turn direction detector of any one of the previous embodiments. The control circuit of FIG. 9 comprises latches 40 and 42 each having input terminal I and output terminal O. The input terminal I of the respective latches 40 and 42 are connected to a pulse generator 44, and the output terminals O are connected to right and left indicator lamps L1 and L2, respectively. Each of the latches 40 and 42 further has a set terminal S which receives a negative going pulse for establishing an electrical connection between the input and output terminals I and O, and a reset terminal R which receives a high level signal for disconnecting the terminals I and O.

A turn indicator switch ST provided in association with a manually operable switch (not shown), such as a momentary switch that operates in a manner of a seesaw, a tumbler switch or a two-button switch, has three terminals TR, TL and TC in which the terminals TR and TL are connected, respectively, directly to the set terminals S of the latches 40 and 42, and the terminal TC is connected to ground. When the manual switch is so operated as to indicate a right turn, the terminals TC and TR of the turn indicator switch ST are connected to each other, and when it is so operated as to indicate a left turn, the terminals TC and TL are connected to each other.

Connected to the rest terminal R of the latch 40 is an OR gate 46 having three inverting inputs which are respectively connected to the terminals TL of the turn indicator switch ST, a cancellation switch SC, and the switch arrangement SL of any one of the previous embodiment. Similarly, the reset terminal R of the latch 42 is connected to an OR gate 48 having three inverting inputs which are connected respectively to the terminal TR of the turn indicator switch ST, the cancellation switch SC, and the switch arrangement SR of said one of the previous embodiment. The operation of the control circuit of FIG. 9 is explained below.

When the manual switch is so operated as to indicate, for example, a right turn, a negative going pulse is applied to the set terminal S of the latch 40 for connecting the input and output terminals I and O of the latch 40 to supply a train of pulse signals to the right indicator lamp L1 and, therefore, the right indicator lamp L1 subsequently blinks.

The cancellation of the right turn indicator can be carried out manually by turning the cancellation switch SC on or by returning the manual switch to its neutral position, or by the closure of the switch arrangement SL effected when the right turn of the automobile is completed, i.e., when the steering wheel 1 is rotated counterclockwise. It is to be noted that a similar operation is carried out for the left turn indication.

Referring to FIG. 10, there is shown another embodiment of the control circuit which comrises switches 53R and 52L which are closed in response to the operation of a manual switch (not shown) of the above described type. The switch 52R is connected to a set terminal S of a latch 54R which, upon receipt of a high level signal to its set terminal S, provides a current to a relay switch 56R to supply a pulsating current to the right indicator lamp L1 from the pulse generator 44. Similarly, the switch 52L is connected to a set terminal S of a latch 54L which, upon receipt of a high level signal to its set terminal S, provides a current to a relay switch 56L to supply a pulsating current to the left indicator lamp L2 from the pulse generator 44. The reset terminal R of the latch 54R is connected to the cancellation switch SC through a diode 58, and also to the switch arrangement SL of the turn direction detector of any one of the previous embodiment. Similarly, the reset terminal R of the latch 54L is connected to the cancellation switch SC through a diode 60, and also to the switch arrangement SR of the turn direction detector of said one of the previous embodiment. The operation of the control circuit of FIG. 10 is explained below.

When the manual switch is so operated as to indicate, for example, right, the switch 52R closes to provide a high level signal to the set terminal S of the latch 54R resulting in closure of the relay switch 56R. Subsequently, the right indicator lamp L1 blinks.

The cancellation of the right turn indicator lamp L1 can be carried out manually by turning the cancellation switch SC on or by returning the manual switch to its neutral position, or by the closure of the switch arrangement SL effected when the right turn of the automobile is completed. A similar operation is carried out for the left turn indication.

Since the turn direction detector of the present invention is not provided mechanically in association with the manual swtich, it is possible to provide the turn direction detector of the present invention at a position remote from the steering wheel. When such an arrangement is employed, a space directly under the steering wheel can be utilized to install other control arrangements, such as, control arrangements for controlling window wipers, various lights, etc.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. A turn direction detector for detecting the direction of turn of a steering wheel shaft of an automobile comprising:
   a support member fixedly connected to a housing of said steering wheel shaft;
   first and second terminal means provided on said support member at a predetermined angle spaced from each other about an axis of said steering wheel shaft;
   a ring member loosely mounted on said steering wheel shaft, said ring member being rotatable about said steering wheel shaft betwen a first rotated position and a second rotated position;
   first electrical contact means provided on said ring member, said first electrical contact means being moved to a position correlative with said first terminal means when said ring member is rotated to said first rotated position, and correlative with said second terminal means when said ring member is rotated to said second rotated position;
   a drive member connected to said steering wheel shaft for effecting the simultaneous rotation with said steering wheel shaft, said drive member having a portion held in contact with said ring member for producing a frictional force between said portion and said ring member, said ring member being moved to said first rotated position when said steering wheel shaft is rotated in a first direction and to said second rotated position when said steering wheel shaft is rotated in a second direction by said frictional force; and
   second electrical contact means provided on said drive member, said second electrical contact means slidingly mounting past said first electrical contact means during the rotation of said drive member, whereby a closed electrical circuit is established among said first and second electrical contact means and said first terminal means during the rotation of said steering wheel shaft in said first direction and among said first and second electrical contact means and said second terminal means during the rotation of said steering wheel shaft in said second direction.

2. A turn direction detector as claimed in claim 1, wherein each of said first and second terminal means comprises first and second terminals, said first terminal being located closer to said steering wheel shaft than said second terminal.

3. A turn direction detector as claimed in claim 2, wherein said first electrical contact means comprises first and second feelers, each feeler having one end extending outwardly from said ring member towards said support member and another end extending outwardly in the opposite direction from said ring member towards said drive member, said first and second feelers being held in contact with said first and second terminals of said first terminal means, respectively, when said ring member is moved to said first rotated position, and said first and second feelers being held in contact with said first and second terminals of said second terminal means, respectively, when said ring member is moved to said second rotated position.

4. A turn direction detector as claimed in claim 3, wherein said second electrical contact means comprises at least one contact member adapted to slidingly bridge over between said another ends of said first and second feelers during the rotation of said drive member.

5. A turn direction detector as claimed in claim 1, wherein each of said first and second terminal means comprises a terminal.

6. A turn direction detector as claimed in claim 5, wherein said first electrical contact means comprises an elongated electrode arranged in a horse-shoe shape about a center of said ring member, one end of said horse-shoe shaped electrode being located at a position correlative with said terminal of said first terminal means when said ring member is rotated to said first rotated position, and the other end of said horse-shoe shaped electrode being located at a position correlative with said terminal of said second terminal means when said ring member is rotated to said second rotated position.

7. A turn direction detector as claimed in claim 6, wherein said second electrical contact means comprises a contact member adapted to slidingly bridge over between said terminal of said first terminal means and said one end of said horse-shoe shaped electrode during the rotation of said drive means in said first direction, and to slidingly bridge over between said terminal of said second terminal means and said other end of said horse-shoe shaped electrode during the rotation of said drive means in said second direction.

8. A turn direction detector as claimed in claim 1, wherein each of said first and second terminal means comprises primary and secondary terminals.

9. A turn direction detector as claimed in claim 8, wherein said first electrical contact means comprises a first feeler and an elongated electrode which is electrically connected to said first feeler, said elongated electrode being arranged in a horse-shoe shape about a center of said ring member, one end of said horse-shoe shaped electrode being located at a position correlative with said secondary terminal of said first terminal means when said ring member is rotated to said first rotated position, and the other end of said horse-shoe shaped electrode being located at a position correlative with said secondary terminal of said second terminal means when said ring member is rotated to said second rotated position, said first feeler being held in contact with said primary terminal of said first terminal means when said ring member is rotated to said first rotated position, and said first feeler being held in contact with said primary terminal of said second terminal means when said ring member is rotated to said second rotated position.

10. A turn direction detector as claimed in claim 9, wherein said second electrical contact means comprises a second feeler having one end adapted to slidingly move along and past said horse-shoe shaped electrode and another end slidingly move past said secondary terminals of said first and second terminal means, said second feeler being adapted to connect said one end of said horse-shoe shaped electrode with said secondary terminal of said first terminal means during the rotation of said drive member in said first direction and to connect said other end of said horse-shoe shaped electrode with said secondary terminal of said second terminal means during the rotation of said drive member in said second direction.

11. A turn direction detector as claimed in claim 1, further comprising a biasing means for urging the driving member towards the ring member and for causing an increase of frictional force between said portion and said ring member.

* * * * *